…

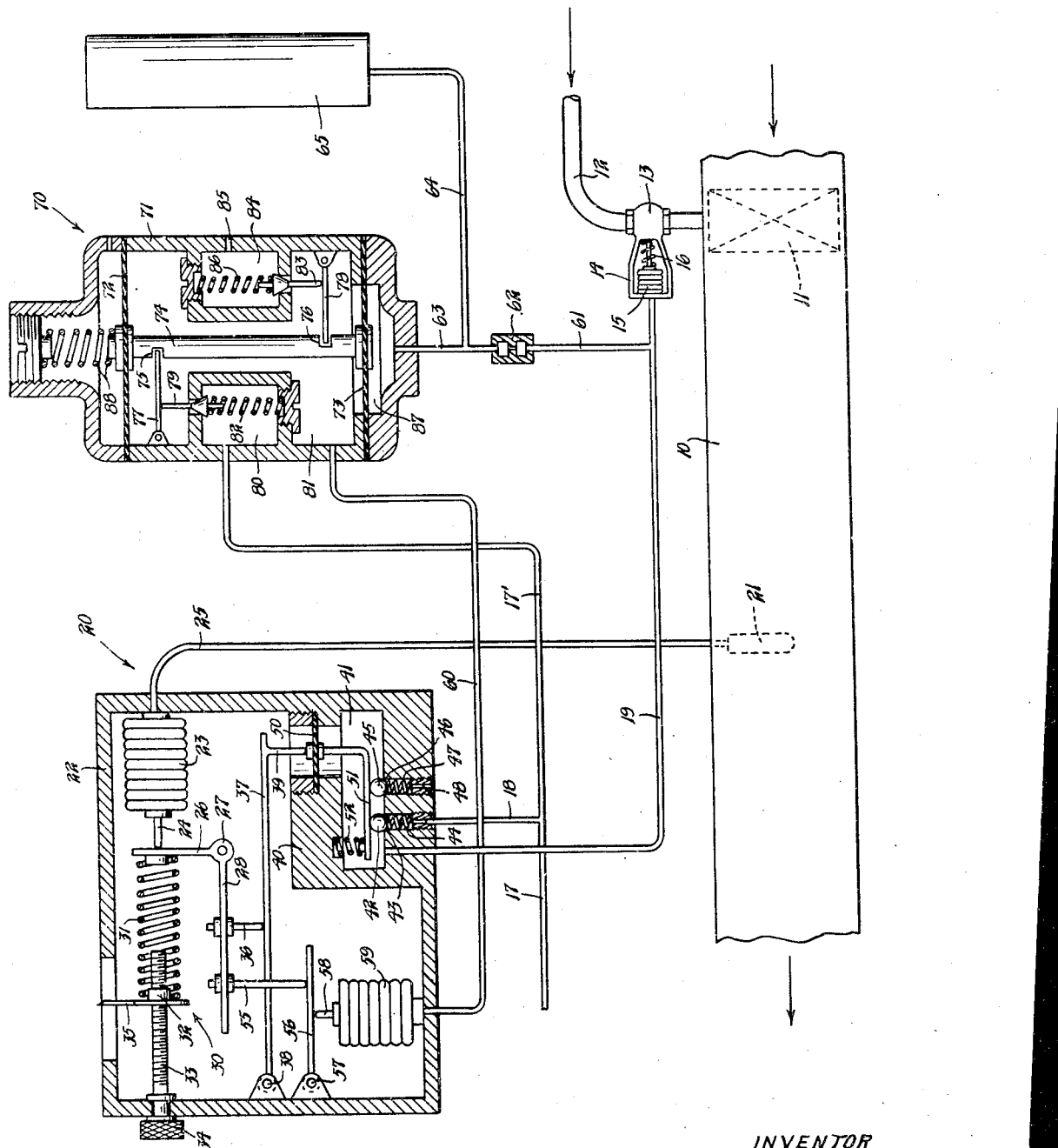

UNITED STATES PATENT OFFICE

2,481,395

AUTOMATIC PNEUMATIC RESET APPARATUS

Vernon J. Carns, Detroit, Mich., assignor to Minneapolis-Honeywell Regulator Company, Minneapolis, Minn., a corporation of Delaware Application December 18, 1944, Serial No. 568,702

2 Claims. (Cl. 236—86)

The present invention relates to automatic reset means for pneumatically operated control apparatus. Valves, dampers, and the like, are commonly operated by pneumatic motor means in a modulating manner. Thus, the valve, damper, or the like, is moved by a pneumatic motor to a position dependent on the air pressure supplied to the motor, the pressure being determined by a suitable control device responding to a control condition.

While the above devices are intended to maintain a specified control condition, it is well known that the control point of a modulating, control system tends to shift depending upon the load. For instance, in an air conditioning system, it is common to provide a duct including a heating coil for heating and conveying outside air to the other air conditioning apparatus. Because the outside air temperature varies considerably, it is necessary to provide a valve for controlling the steam flow which is sufficiently large for the maximum load to be imposed on the coil by very cold outside air. However, it is also necessary to provide heat for the air when the outside air is but a few degrees below the desired control point. Obviously, the valve that is large enough for large flows is difficult to control for low flows because a specified valve stem movement has less effect on the flow through the valve when same is nearly open than it does when the valve is nearly closed. In addition, for each repositioning of the valve, there must be sufficient change in the control condition to effect a response by the control apparatus. As the result, if the controller is adjusted to move the valve from open to closed position with a small, say 2 degrees, temperature difference at the control bulb, ordinary commercial apparatus will be found unstable and will tend to "hunt," especially on light loads where a small amount of valve stem movement considerably varies the steam flow. The apparatus can ordinarily be rendered stable by increasing the throttling range to, for instance, 10 degrees, but this variation is generally not acceptable in air conditioning work. With a valve fully closed at a 70 degrees air temperature, the air temperature would have to drop to 60 degrees to cause the valve to be wide open when a 10 degrees throttling range is used. The variation in the control condition required for full movement of the controlling device is inherent in all modulating or proportioning systems and is commonly known as the offset or "droop" of the system.

Various attempts have been made to minimize the offset in proportioning systems with only mediocre success. The apparatus used has generally been costly, cumbersome, and in many cases, not sufficiently effective. The present apparatus comprises simple and readily available equipment and gives excellent results. It is therefore a principal object of this invention to provide simple and effective automatic means for eliminating the offset or "droop" of a modulating pneumatic control system.

It is an object to provide pneumatic control apparatus adapted to maintain a given value of a control condition without appreciable deviation even though the loads may vary widely.

It is a further object to provide delayed automatic pneumatic reset means for control apparatus.

It is an additional object to provide control apparatus with automatic reset means without external moving parts. The links, levers, and the like, used with some reset systems increase installation costs and are easily damaged. As will be noted, the present apparatus comprises compact units connected only by tubing.

It is a further object, as may be anticipated from the above, to provide an automatic pneumatic reset system that is flexible in its installation requirements so that each piece of apparatus may be located to best advantage, subject only to the making of the required connections with small and flexible tubing.

It is a further object to provide an automatic pneumatic reset system comprising, for the most part, standard and readily available units, and the balance of the apparatus being of such simplicity that it can be shop or field fabricated.

In addition, it is an object to provide a control system of the present sort which is highly efficient in its controlling action and which is thoroughly dependable.

These and other objects will become apparent from a study of the present specification and drawing.

The single figure of the drawing schematically shows a preferred embodiment of the present apparatus, certain of the units being shown in sectional elevation.

The preferred embodiment of this invention contemplates the control of air temperature and the present specification describes apparatus for such use. In the drawing, outside air is introduced into a structure through duct 10 having therein a heat exchanger 11. Heat exchanger 11 is supplied steam through pipe 12 and condensate is removed by suitable means, not shown. The flow of steam through pipe 12 is controlled by valve 13, said valve being graduatingly operated by pneumatic motor means 14. Valve motor means 14 is of a sort wherein the valve is held wide open on minimum air pressures, and is closed with maximum pressures, said valve assuming intermediate positions when intermediate pressures are applied to the motor means 14. It is now clear that a low air pressure supplied motor 14 will result in valve 13 passing large quantities of steam for heating the air flowing through duct 10, while higher pressures imposed on said motor 14 cause a restriction of the steam flow and limits the heating of said air.

Motor means 14 is shown in a simple form and comprises a bellows 15 for closing the valve and an opposing spring 16 for opening the valve. When the pressure in bellows 15 is high, the same expands and moves the valve stem to the right in opposition to the spring 16 until the gradually increasing resistance of the spring balances the force exerted by the bellows whereas, when the pressure in bellows is lowered, the spring 16 is able to move the valve stem to the left and to collapse the bellows until a point is reached at which the spring force balances that exerted by the bellows. A modulated flow is thus obtained through valve 13 by varying the pressure of the air supplied bellows 15 of motor 14. Although motor means 14 is shown as a simple, direct acting, device, it is, of course, obvious that it may take other forms and that the controlling air pressure may be used to energize a relay which in turn controls the motor.

Air for the operation of motor 14 is supplied by main 17 from a suitable source, not shown, through tube 18, controller 20, and tube 19, to bellows 15 of motor 14. The air pressure in main 17 may be regulated to a predetermined value, such as 15 pounds per square inch, while the pressure of the air in tube 19 is determined by controller 20 and may, in practice, vary between a minimum of 3 pounds per square inch and a maximum of 12 pounds per square inch.

Device 20, as shown, is a conventional submaster type controller and responds to the air temperature in duct 10 by reason of the thermostatic bulb 21 inserted therein. Controller 20 includes a housing 22 within which is located bellows 23. The bellows 23 has an abutment or stem 24 at its inner end and is connected at its other end by capillary tube 25 to bulb 21. The bulb-bellows system 21, 25, and 23 is charged with a suitable volatile fluid and gives a pressure response to changes in temperature. An increase in temperature at bulb 21 causes an expansion of bellows 23 and movement of 24 to the left, whereas a decrease in said temperature permits reverse movement of 24. Stem 24 bears against vertical arm 26 of bell-crank 27, said bell-crank including a horizontal arm 28.

Arm 26 is held in engagement against 24, and expansion of bellows 23 is opposed, by spring means 30 acting against the left-hand side of said arm 26. Spring means 30 includes a suitable coil spring 31 held in place at one end by suitable means on lever 26, and by a threaded retainer 32 at the other end. For adjustment purposes, a pivotally mounted longitudinally restrained means 33 having knob 34 is screw threadedly engaged with retainer 32. By turning knob 34 one way or the other the spring force may be varied, thus varying the control point of the instrument, as will be seen. Pointer means 35 is carried by retainer 32 and cooperates with suitable indicia, not shown, to indicate the adjusted control point.

Force exerted by bellows 23 on arm 26 of bell-crank 27 is communicated through arm 28 and a slidably adjustable fixture 36 to a secondary lever 37. Lever 37 is pivotally mounted at 38 and has an extension 39 coacting with a valve unit 40. Varying the position of fixture 36 varies the throttling range of the controller, movement to the left increasing said range.

Valve unit 40 includes a hollow chamber 41 in direct communication with tube 19 and motor 14. The chamber 41 is also in valve-controlled communication with branch 18, taken from main 17, the valve including a ball 42 engaging a seat 43. A spring 44 acts to force ball 42 off its seat. Chamber 41 also communicates with the atmosphere through a similar valve structure wherein a ball 45 coacts with a seat 46 and is urged off said seat by a spring 47. When ball 45 is off seat 46, chamber 41 may bleed off excess air through opening 48 to the atmosphere. A flexible diaphragm 50 seals off chamber 41 and is capable of responding to air pressure within said chamber. Diaphragm 50 has firmly attached thereto an angular lever 51 adapted to rest on the top side of balls 42 and 45 and, when in normal position, to hold them against their respective seats. Spring means 52 assists in holding down the remote end of lever 51. In addition to responding to air pressure within chamber 41, diaphragm 50 also responds to forces exerted by extension 39 of secondary lever 37. When diaphragm 50 is forced downward, the horizontal portion of lever 51 pivots about ball 45 and tends to raise off ball 42. However, spring 43 immediately lifts ball 42 off its seat and keeps the same in contact with lever 51. When ball 42 rises from its seat, air from main 17 and branch 18 is permitted to flow into chamber 41 and thus increase the pressure in same. When the pressure has increased in chamber 41 sufficiently to force diaphragm 50 to its neutral position, that is, when the force due to the air pressure is sufficient to counterbalance the force exerted by lever 37, lever 51 again assumes its neutral position and balls 42 and 45 are held against their seats. The pressure in chamber 41 is thus increased when diaphragm 50 is forced downwardly, the increase being sufficient to force diaphragm 50 back to its neutral position. When the pressure in chamber 41 is sufficient to deflect diaphragm 50 upwardly, lever 51 tends to rise off balls 42 and 45. Spring 52 holds down the remote end of lever 51 and thus keeps ball 42 against its seat. However, ball 45 is forced off its seat by spring 47, this permitting air to flow from chamber 41 to the atmosphere. The bleeding off of air from chamber 41 to the atmosphere through this open valve causes the pressure in said chamber to diminish and eventually results in diaphragm 50 being forced to its neutral position by the pressure exerted by lever 37. It is now noted that upward movement of diaphragm 50 causes a reduction in air pressure in chamber 41.

Arm 28 of bell-crank 27 also carries an adjustable fixture 55. Fixture 55 coacts with an auxiliary lever 56 which is pivotally mounted at 57 to housing 22. Lever 56 is urged against fixture 55 by abutment 58 of bellows 59, the forces exerted by bellows 59 thus tending to oppose forces exerted by bellows 23. This latter mechanism, comprising fixture 55, lever 56 and bellows 59, comprises what is called the reset means for controller 20. Because bellows 59 opposes bellows 23, an increase in pressure in bellows 59 requires a greater temperature rise at bulb 21, and a corresponding increase in pressure in bellows 23, for operation of the valve unit 40, thus the amount of reset is increased by increasing the pressure in bellows 59.

Air for reset bellows 59 is supplied through tube 60 from a reverse acting relay means 70. Relay means 70 is supplied with air through an extension 17' of main 17 and is actuated by the air pressure existing in tube 19. Tube 19 is connected to said relay through branch tube 61, restricted orifice means 62, and tube 63. A branch 64 is taken off tube 63 and connects to an otherwise sealed container 65. The orifice 62 and container 65 are used to slow down the response of relay means 70 to changes in pressure in tube 19.

Reverse acting relay means 70 is conventional and comprises a casing 71 and a pair of spaced, flexible diaphragms 72 and 73, diaphragm 73 having just one half of the effective area of diaphragm 72. Diaphragms 72 and 73 are connected by bar member 74 having notches 75 and 76. Notch 75 coacts with and operates pivoted lever 77, while notch 76 coacts with and operates pivoted lever 78. Lever 77 controls valve member 79, which in turn controls the passage of air from chamber 80, in communication with tube 17', to main chamber 81. Valve means 79 is urged to closed position by spring 82. Lever 78 controls valve member 83, which in turn controls the flow of air from main chamber 81 to chamber 84, said chamber 84 being in communication with the atmosphere through opening 85. Spring 86 urges valve member 83 to closed position.

Diaphragms 72 and 73 and inter-connecting bar 74 are urged upwardly by the air pressures existing in spaces 87 and 81, and are urged downwardly by an adjustable spring means 88. Spring 88 is so adjusted that diaphragms 72 and 73 and bar 74 will be in neutral position and valve members 75 and 83 will each be closed when the sum of the pressures in chambers 81 and 87 is a predetermined value, such as 15 pounds per square inch. Thus, when the sum of the pressures in spaces 87 and 81 is but 10 pounds per square inch, bar 74 is forced downwardly, lever 77 rotates clockwise and opens valve 79, thus permitting high pressure air to flow into chamber 81 from chamber 80 to increase the pressure in chamber 81. If the pressure in space 87 is 5 pounds per square inch, an increase in the pressure in 81 to 10 pounds per square inch will cause diaphragms 72 and 73 and bar 74 to be forced back to their neutral position against spring 88, thus closing valve 79 and preventing further increase in pressure in 81. This will occur due to the force upwardly against diaphragm 72 exceeding the force downwardly on diaphragm 73 by an amount corresponding to the force that would be exerted if the pressure in 87 is increased by 10 pounds per square inch and the pressure in 81 reduced to zero. However, assuming that the pressure in chamber 81 is now 10 pounds per square inch, and the pressure in 87 rises to 7 pounds per square inch, the excess of 2 pounds per square inch pressure forces the diaphragms and bar 84 upwardly against spring 88. This causes clockwise movement of lever 78 and opening of valve 83. The opening of valve 83 permits the higher pressure air in chamber 81 to exhaust past said open valve into chamber 84, which is in communication with the outside air. This permits the pressure in chamber 81 to diminish to such a value, in this case 8 pounds per square inch (15 minus 7 equals 8), that spring 88 is again able to force diaphragms 72 and 73 and bar 74 back to their neutral position. For a fuller description of this relay, reference is made to Figure 4 of Joesting Patent 2,286,282, issued June 16, 1942.

As before noted, orifice 62 and container 65 are used merely for delaying changes in pressure in 87 in response to changes in pressure in tube 19. It has been found that by using a container 65 having about a 40 cubic inch capacity and a suitably sized orifice, fully responsive pressure changes in 87 will tend to lag 2 or 3 minutes behind those in 19. By thus delaying the action of the reset means, the apparatus is rendered more stable.

To make the description of the present control apparatus more clear, the following recital of operation will more fully relate the functioning of said apparatus.

*Operation*

In the following description of operation, it should be noted that the values given are only suggestive and intended to render the description more clear; they are not to be considered in a limiting sense. Further, rather than describe the operation of the complete apparatus, it appears that clarity might be gained in initially ignoring the reset apparatus, and then by pointing out how the reset apparatus modifies and improves the action of the other equipment. In addition, it is noted that conventional controllers of the present sort are ordinarily calibrated so that the control point is intermediate the ends of the throttling range. For instance, for a 70 degrees control point and a 10 degrees throttling range, the controller would actually throttle between temperatures of 65 degrees to 75 degrees, the average being the required 70 degrees. However, when using the present reset means, it is more convenient to choose one end of the throttling range as a control point so that the deviation from the control point due to throttling range is all in the same direction. For instance, in the present description, with a 70 degrees control point and a 10 degrees throttling range, the controller (ignoring the reset means) will throttle between 60 and 70 degrees. The value of the throttling range to be used may be arbitrarily determined from past experience or from experiments with installed apparatus. In either event, a throttling range is selected which is large enough to insure stable operation, the present figure of 10 degrees being given as a reasonable and convenient value. As before noted, the throttling range is varied by shifting fixture 36, movement of same to the left increasing said range.

Assuming that duct 10 is to be used to convey outside air to other apparatus and that heater 11 is to be used to heat said air to a desired temperature, such as 70 degrees it may be further assumed that heat exchanger 11 and its steam supply including valve 13 is sufficiently large to heat said air to said value when the outside air temperature is at −20 degrees. It is intended further that the air passing through duct 10 be heated even when the outside air temperature is but a few degrees below the required 70 degrees.

As before noted, valve 13 is controlled by motor 14 in a manner to be held wide open at air pressures of 3 pounds per square inch or less and to be fully closed at pressures of 12 pounds per square inch or more; further, at 7½ pounds per square inch the valve is half open, other intermediate valve positions being likewise related to said air pressure. As to the characteristics of controller 20, it is noted that the controlled pressure will bear a straight line relation to temperature, within the throttling range. At 70 degrees, the controlled pressure (in chamber 41) will be 12 pounds per square inch; at 65 degrees the pressure will be 7½ pounds per square inch and at 60 degrees the pressure will be 3 pounds per square inch, with other intermediate values correspondingly related.

If the present apparatus be put in operation, and outside air at 65 degrees be supplied through duct 10, the pressure in bulb 21 and bellows 23 may be diminished, permitting spring means 30 to force arm 26 to the right and tending to lift fixture 36 from lever 37. Diaphragm 50 will tend to rise as pressure is relieved from lever 37 and permit opening of valve 45. This permits bleeding of the air from said chamber to lower the pressure therein, and thus, due to connections by tube 19, lowers the pressure in bellows 15 of motor 14. As before noted, low pressure in 14 results in an open valve, hence it follows that valve 13 is operated to an open position. However, but little heat is needed and the heated air quickly rises in temperature. With an increase in temperature in bulb 21, the pressure in bellows 23 is increased, fixture 36 is pressed against lever 37, and lever 37 depresses diaphragm 50. As diaphragm 50 is depressed, lever 51 fulcrums on ball 45 and permits ball 42 to rise off its seat and permit higher pressure air to enter chamber 41 and to flow to motor 14. Pressure will build up in motor 14 and chamber 41 until diaphragm 50 is forced, against the resistance of lever 37, back to its normal position. As before noted, the higher the pressure rises in motor 14, the more closed the valve becomes. A balance will be reached when the air temperature is slightly below 70 degrees, the air pressure in chamber 41 and motor 14 near 12 pounds per square inch, and with valve 13 being but slightly opened.

If the outside air temperature should now drop to −20 degrees F., the slightly opened valve 13 will be unable to supply the heat demand and the temperature at 21 will drop. As before noted, a decrease in temperature at bulb 21 and the resulting decrease in pressure in bellows 23 permits diaphragm 50 to rise and permits valve 45 to rise off its seat and bleed off excess pressure. The lowered pressure then permits spring 16 to further open valve 13 and provide more heat for the air. At the temperature stated for the outside air (−20°), valve 13 must be wide open to provide enough heat to raise the air temperature to 70°. This, it will be noted, requires that the air pressure in motor 14 must be lowered to 3 pounds per square inch. However, the air pressure can be lowered to 3 pounds per square inch only by depressing the control point to 60 degrees due to the aforementioned throttling range. As there is a slight excess of heat, with a wide open valve, at a 60 degrees control point, the valve will tend to be controlled to balance at a nearly opened position and with an air temperature slightly above 60 degrees. If the full capacity of the valve was required for a 60 degrees temperature, instead of 70 degrees, the valve would balance at the wide open position, and the treated air temperature and controlled air pressure would be 60 degrees F., and 3 pounds respectively.

In the description just set forth, the apparatus and its function has been conventional although generally a smaller throttling range is used even at the expense of some "hunting." No mention has been made of the reset means although it comprises the essence of the present invention.

The reset means of controller 20 comprising adjustable fixture 55, pivoted lever 56, and bellows 59 has been previously related. It is now noted that the reset pressure which may be imposed on bellows 59, will vary from 3 pounds to 12 pounds per square inch. Because the throttling range of controller 20 was established at 10 degrees, thus permitting a maximum deviation of the control point of 10 degrees, it seems obvious that if the reset means is to maintain the control point at a predetermined value, such as 70 degrees, it must have a reset range of 10 degrees. Therefore, the reset range is adjusted to correspond to the throttling range by shifting fixture 55 laterally along lever 28.

The air pressure supply for reset bellows 55 was previously noted to be reverse acting relay 70, which provides reset pressures varying from 3 to 12 pounds per square inch as the pressure supplied motor 14 varies from 12 pounds to 3 pounds per square inch. The action of this relay, as well as that of the reset mechanism, may now be considered by reviewing the initial operation of the system.

With a light heat load imposed on the system, the air pressure supplied motor 14 of valve 13 approaches 12 pounds per square inch. In addition to this pressure being exerted in bellows 15, air also flows through tube 61, orifice 62, and tube 63 into space 87; also from tube 63 through tube 64 into container 65. Because of the restricting effect of orifice 62 and container 65, two or three minutes may elapse before the pressure in space 87 is the same as in tube 19. While the pressure has been building up in space 87, the pressure in space 81 has been gradually lowered in a manner previously related. When the pressure in 87 is nearly 12 pounds per square inch, the pressure in 81 is slightly over 3 pounds per square inch. The pressure in chamber 81 is communicated to bellows 59 by tube 60, hence the reset pressure is slightly over 3 pounds per square inch. As a variation in reset pressure from 3 pounds to 12 pounds provides a reset in degrees of 0 degrees to 10 degrees, slightly over 3 pounds reset pressure provides a slight reset in degrees, sufficient to restore the control point from slightly below 70 degrees to 70 degrees.

With a sufficient load on the heat exchanger 11 to require a half open valve, controller 20 must throttle to provide 7½ pounds per square inch air at motor 14 to meet the demand, but it was previously noted that the control point must drop to 65 degrees to provide 7½ pounds pressure for the valve. With a drop in pressure in 87 to 7½ pounds per square inch, and with slightly over 3 pounds per square inch pressure in chamber 81, spring 88 forces bar 74 down, opens valve 79 and bleeds high pressure air into chamber 81. When the pressure in 81 reaches 7½ pounds per square inch, its pressure plus that in 87 totals 15 and bar 74 is restored to neutral position. A 7½ pounds per square inch pressure in bellows 59 opposes the operation of bellows 23 sufficiently that the temperature at bulb 21 must now rise to 70 degrees before controller equilibrium can be reached. Again, the control point is restored to 70 degrees by the reset means.

With the full load conditions on heat exchanger 11, it is necessary that the air pressure in motor 14 be reduced to 3 pounds per square inch, to provide a wide open valve for handling said load. However, this can be done by controller 20 only with a full "droop" of 10 degrees of the control point. As before pointed out, the condition of full load at a 70 degrees control point would be less than full load at a 60 degrees control point, hence the system would tend to balance out at slightly over 60 degrees. However, as the pressure in 19 approaches 3 pounds per square inch, the pressure in 87, lagging behind, also approaches 3 pounds per square inch, and the pressure in chamber 81 approaches 12 pounds per square inch, hence the reset pressure in bellows 59 approaches 12 pounds per square inch pressure. As before noted, a 12 pounds per square inch reset pressure increases the resistance to bellows 23 sufficiently to raise the control point 10 degrees. With the raised control point, full load is thrown on the heating means, bellows 23 is opposed by bellows 59, and a minimum pressure in 41 is able to raise diaphragm 50, thus lowering said pressure to a 3 pounds per square inch value necessary for a wide open valve position. With 3 pounds per square inch pressure at the valve, the reset pressure is 12 pounds, the controller is reset 10 degrees and the control point is maintained at 70 degrees.

It has now been shown how stable operating conditions of a modulating control system may be obtained by using a wide differential or throttling range. Further, by using a controller which may be reset by pressure, by providing a reset pressure inversely proportional to the control pressure, by providing time-delay means for the reset means, and by adjusting the reset range to be equal to the throttling range, a predetermined control point may be maintained without appreciable deviation even under widely varying load conditions.

The preferred embodiment of the present invention has been rather specifically set forth but this specific recital is intended only as the best means of pointing out said invention. Upon studying the present invention, many substitutions and equivalents will come to mind, therefore it is intended that the scope of the present invention be determined only by the appended claims.

I claim:

1. A pneumatic control system including a device to be controlled; a submaster type controller comprising a force exerting condition responsive means, a spring opposing said means, a first pressure actuated motor also opposing said means, a second pressure actuated follow-up motor opposing said means, and a valve mechanism operated as a resultant of the condition responsive means, said spring and both of said motor means, said mechanism including supply and bleed valves closed when in neutral position, said valve mechanism determining the pressure to be imposed on said device, said pressure also being imposed on said second motor for moving said valves to neutral position; first conduit means connecting said valve mechanism to said device; a reverse acting relay having a plurality of pressure chambers and constructed so that the pressure in one of said chambers controls said relay and the pressure in another chamber varies inversely relative to the pressure in said one chamber; second conduit means including a restriction connecting said one chamber to said first conduit means; and third conduit means connecting said other chamber to said first pressure actuated motor.

2. A pneumatic control system including a device proportionally controllable by variations in branch line air pressure; a submaster controller for said device, said controller including a force exerting condition responsive means, a spring opposing said means, a pneumatic motor assisting said spring in opposing said means, valve means operable by said means for controlling branch line air pressure, and branch pressure actuated follow-up means also opposing said condition responsive means, said follow-up means being constructed and arranged to require a predetermined variation in the condition to which said condition responsive means responds to cause a predetermined variation in branch line air pressure, said pneumatic motor being constructed and arranged to adjust said controller by an amount substantially equivalent to said variation in the condition to which said condition responsive means responds; a reverse acting pneumatic relay having a control chamber, and a controlled chamber, said relay being constructed to give pressures in said controlled chamber varying inversely with variations in pressures applied to said control chamber; a branch and conduit connecting the valve means and follow-up means of said controller to said device; another conduit connecting the controlled chamber of said relay with said pneumatic motor; and an additional conduit including a flow restricting means connecting said branch conduit and the control chamber of said relay.

VERNON J. CARNS.

REFERENCES CITED

The following references are of record in the file of this patent:

UNITED STATES PATENTS

| Number | Name | Date |
| --- | --- | --- |
| 2,285,540 | Stein | June 9, 1942 |
| 2,286,282 | Joesting | June 16, 1942 |
| 2,292,761 | Krogh | Aug. 11, 1942 |
| 2,310,293 | Joesting | Feb. 9, 1943 |
| 2,326,226 | Joesting | Aug. 10, 1943 |

OTHER REFERENCES

Smith, "An Introduction to Control Engineering," published 1942, by Ed. S. Smith, Brooklyn, N. Y. Two volumes, vol. 1 (text), page A2-4 (1 page), vol. 2 (Figures), page 2.

Certificate of Correction

Patent No. 2,481,395 September 6, 1949

VERNON J. CARNS

It is hereby certified that error appears in the printed specification of the above numbered patent requiring correction as follows:

Column 10, line 37, for the words "and conduit" read *air conduit*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*